3,172,904
PROCESS FOR PREPARING MIXED ESTERS OF DICARBOXYLIC ACIDS
Caleb Rehfuss, North Wales, Pa., assignor to Allied Chemical Corporation, New York, N.Y., a corporation of New York
No Drawing. Filed Feb. 2, 1961, Ser. No. 86,695
6 Claims. (Cl. 260—475)

This invention relates to a process for preparing mixed esters of dicarboxylic acids derived from cyclic anhydrides, and more particularly to a process wherein high yields of mixed ester are obtained, and wherein symmetrical diester formation is minimized.

It is known to prepare mixed esters of dicarboxylic acids by a number of processes, including a process which involves reacting a dicarboxylic acid anhydride such as phthalic anhydride, first with an alcohol to form the half ester of phthalic acid, and then, with or without isolation of the half ester, reacting said half ester with a second alcohol to form a neutral, mixed diester.

Strong acid esterification catalysts have been used in both stages of such mixed ester esterification processes, but these have generally proved unsatisfactory in preparation of the monoester due to the tendency of the common esterification catalysts to promote production of the diester, even when only sufficient alcohol is added theoretically to complete the esterification of a single carboxylic acid group. Consequently, it has been the general practice to prepare the half ester by first reacting the anhydride with an alcohol in the absence of a catalyst in an effort to obtain the maximum yield of half ester, and then completing the esterification with a second alcohol in the presence of an esterification catalyst. Esterification in the absence of a catalyst is necessarily slow, and such prolongation of time tends to result in the formation of unwanted diester. Increase in temperature in this stage in an effort to hasten the reaction results in production of esters of undesirably high coloration.

It is known that in general the lower molecular weight aliphatic alcohols react more rapidly with dicarboxylic acid anhydrides than do the higher molecular weight alcohols. Thus, in the preparation of mixed esters, the more successful processes have usually prepared the half ester of the lower alcohol in the absence of a catalyst, and have then completed the esterification with the higher molecular weight alcohol in the presence of a catalyst such as sulfuric acid. As brought out above, however, to achieve high yields of half ester in the uncatalyzed first stage requires use of relatively high temperatures in the region of about 140–150° C., which results in the formation of dark colored esters. Lower temperatures require longer times which induce formation of higher percentages of diester.

Thus, even the best of the above prior art esterification processes are unsatisfactory in certain respects, either in producing low yields of mixed ester or in producing esters contaminated with appreciable proportions of diester of the lower molecular weight alcohol, or in producing esters of unacceptably high color, or in having a combination of these drawbacks.

For many purposes in which the mixed esters are used as plasticizers, e.g., in synthetic rubbery materials such as polyvinyl chloride, polystyrene, and the like, presence of a symmetrical diester, especially a diester of a lower molecular weight alcohol, causes serious modification of the volatility characteristics of the resulting ester. Thus, bleeding and volatilization of a portion of the plasticizer from the finished product results so as to make the ester containing it less suited for the use intended.

It is an object of the present invention to provide a process for preparing mixed esters of dicarboxylic acids derived from cyclic acid anhydrides with aliphatic and cycloaliphatic alcohols in high yields of good color, and with a minimum of contamination with symmetrical diesters of the respective alcohols.

A further and more specific object of the invention is to provide a process for preparing mixed aliphatic and cycloaliphatic esters of dicarboxylic acids, wherein production of the diester of the lower molecular weight alcohol is sharply minimized, or substantially completely avoided.

These and other objects are accomplished according to my invention wherein one molecular equivalent of a cyclic dicarboxylic acid anhydride is heated with up to about 12% in excess of one molecular equivalent of a first aliphatic or cycloaliphatic alcohol in the presence of an entrainer liquid and a small quantity of phosphoric acid as catalyst, at a temperature between about 110° C. and about 130° C., to produce the half ester product. The resulting monoester product may be reacted, with or without prior isolation, with at least an 8% stoichiometric excess of a second aliphatic or cycloaliphatic alcohol in the presence of benzene sulfonic acid or other strong acid catalyst at a temperature between about 125° C. and about 140° C. until esterification is complete.

Any cyclic dicarboxylic acid anhydride may be used to prepare the mixed esters of this invention. Such cyclic anhydrides as phthalic, maleic, and succinic are particularly suitable.

In the first stage of my process, conversion to the half ester is exceptionally high. For example, in the case of phthalic anhydride the yield is not less than about 80%, and is often as high as 98% or more, the exact amount depending somewhat on the alcohol used and on the variation of conditions within the ranges stated. Most existing processes for phthalic acid produce less than about 60% of the half ester at esterification temperatures conducive to production of light colored esters, and even at higher temperature rarely attain more than about 70% yield.

It is apparent, that the proportion of half ester produced in the first stage largely determines the yield of mixed ester in the second stage. It is also apparent, that when the reaction mixture from the first stage is used without isolation of the half ester, the possibility for contamination of the final product with lower molecular weight diester is not significantly greater than the equivalent of the unreacted acid anhydride remaining at the end of the first stage. The second stage reaction, then converts the monoester to a mixed diester, and converts the previously unreacted acid anhydride to a diester of the two alcohols. Thus, the proportion of lower molecular weight diester will in any event be quite small when the first stage conversion to monoester is 80%, and even smaller when higher conversions are achieved.

I prefer to carry out the process of my invention by first producing the half ester of the higher molecular weight alcohol, then completing the esterification to the mixed diester with the lower molecular weight alcohol.

The action of phosphoric acid as a catalyst in preparation of the half ester appears to be unique in promoting the esterification reaction, and in inhibiting production of the symmetrical diester at the temperatures employed. The usual strong mineral acid esterification catalysts such as sulfuric acid and the sulfonic acids are unsatisfactory as they not only promote production of large proportions of symmetrical diester at the expense of monoester, but also result in highly colored esters.

In carrying out the process according to my invention, a mixture of the first alcohol, with entrainer and phosphoric acid catalyst, is heated to about 60° C., and an acid anhydride is then added to the liquid mixture. The esterification mixture is then heated to reflux, e.g. to about 110° to 130° C., and maintained at this temperature until the desired conversion to the half ester is obtained. This is usually not more than about one hour. After preparation of the half ester in the above manner, the reaction mixture is mixed with a second alcohol, which cools the mixture somewhat. The temperature of the mixture is further cooled, if necessary, to bring it to or below about 95° C. whereupon the benzene sulfonic acid catalyst is added. Heat is then applied to bring the esterification mixture to the desired temperature for completing the esterification to the neutral diester. The resulting crude mixed diester may then be recovered and purified in a conventional manner as by neutralization with dilute alkali, steam stripping, carbon treatment, etc.

In preferred operation, alcohols suitable for use in the first stage may be represented as

ROH wherein R is an aliphatic or cycloaliphatic hydrocarbon radical having from 6 to 14 carbon atoms inclusive. The alcohols suitable for use in my second stage may be represented as

R'OH wherein R' is an aliphatic radical having from 4 to 8 carbon atoms, or a cycloaliphatic radical having from 6 to 8 carbon atoms, and wherein the number of carbon atoms, and wherein the number of carbon atoms in R minus the number of carbon atoms in R' is at least 1.

If desired, however, the two alcohols may be interchanged so that R'OH is used as the first alcohol and ROH is the second alcohol.

Alcohols suitable for use in the first stage of my preferred process include the hexyl alcohols, especially n-hexanol, cyclohexanol, etc., the heptanols, the octyl alcohols including straight and branched chain octyl alcohols such as n-octanol, 2-ethylhexanol, nonyl alcohol, the decyl alcohols, both straight and branched chain, the undecyl alcohols, the dodecyl, tridecyl and tetradecyl alcohols. Especially useful in the plasticizer art and advantageously used in my invention are the branched chain octyl and decyl alcohols obtained by the "oxo" process wherein an olefin is reacted with carbon monoxide and hydrogen under conditions to form aldehydes, and the aldehydes are then converted into alcohols usually in the $C_6$–$C_{14}$ carbon atom range. The resulting alcohols are usually fractionated to produce cuts comprising mixtures of $C_8$ alcohols, $C_{10}$ alcohols, or higher fractions, etc. These cuts, often designated as "isooctyl" alcohol and "isodecyl," etc. alcohols, are usually mixtures of branched chain alcohols of the indicated number of carbon atoms.

Alcohols suitable for use in the second stage of the preferred process include the butanols, the pentanols, hexanols, heptanols and octanols, including the normal and isooctanols as discussed above.

Suitable entrainers are those azeotrope-forming liquids conventionally used in esterification operations including benzene, toluene, xylene, ligroin and the like. Benzene is preferred. Amounts of entrainer suitable are between about 8 parts and about 15 parts by weight based on the weight of the esterification mixture.

In order to obtain high yields in the first step of the esterification process, it is desirable to use a small molecular excess of high molecular weight alcohol over that required to esterify one carboxylic acid group of the acid anhydride used. For example, between about 8% and about 12% is applicable, a 10% excess being about optimum. Use of a strict, theoretical, monomolar equivalent of the alcohol may be practiced, but this results in lower yields of half ester with an appreciable part of the acid anhydride being unreacted, whereas a higher molecular excess also results in lower half ester yields with production of considerable diester.

Similarly, an approximately 8% to 12% molecular excess of low boiling alcohol is used in the second stage. Larger excesses appear to result in excessive ester interchange causing the production of low molecular weight (symmetrical) diester and reduced mixed ester yields, while smaller excesses or no excess at all results in incomplete esterification.

Temperatures at which the esterification is carried out are especially critical in the first stage of the process. Thus, temperatures in the first stage should be at least about 110° C. to produce sufficiently rapid reaction, but should not exceed about 130° C. to insure the formation of diesters of good color characteristics. Temperatures between about 115° C. and about 125° C. are preferred. Temperatures in the second stage are preferably somewhat higher than in the first stage, and usually range between about 125° C. and about 140° C.

The time needed to produce the optimum yield of the half ester in the first stage of the reaction is usually about 1 hour or less, but this time may vary somewhat depending on the alcohol employed, the temperature and the percentage of phosphoric acid catalyst used, and may be as high as about 2 hours in some instances. Completion of he esterification of the half ester to the diester with the second alcohol usually requires a somewhat longer period than half ester production, but is usually substantially complete in about 3 to 6 hours. Completion of esterification to half ester may be determined by titration of samples of the reaction mixture with sodium hydroxide and calculating the remaining acidity in terms of NaOH equivalents, as is well known.

Quantities of phosphoric acid catalyst used to promote half ester production in the first stage of my process should be at least about 0.05% by weight based on the weight of the acid anhydride charged. In general, amounts between about 0.08 and about 0.3% on the above basis are optimum. Larger amounts appear to do no harm, but are unnecessary.

The following specific examples further illustrate my invention.

EXAMPLES 1 AND 2

*Preparation of isooctyl isodecyl phthalate*

Solid, flake phthalic anhydride was added in the proportions indicated in Table I to a 60° C. mixture containing an approximately 10% molar excess of isodecyl alcohol, benzene entrainer, and 0.1% phosphoric acid catalyst based on the weight of phthalic anhydride. The resulting mixture was heated under total reflux for the time and at the temperature shown in Table I. The conversion to the half ester was determined by titration with sodium hydroxide.

To compare half-ester production by the process of my invention against processes which employ either no catalyst at higher temperatures or a benzene sulfonic acid catalyst, comparative runs A–C were also made and are included in Table I.

Since preparation of the half ester from alcohol and acid anhydride is a direct addition reaction, no water should be formed in this step, and, indeed, no water was produced when the phosphoric acid catalyst was used.

When benzene sulfonic acid was used as a catalyst, water was produced, indicating that a diester was formed, i.e. one mole of diester for each mole of water.

Table I below lists conditions and results of the tests.

TABLE I

*Preparation of isodecyl hydrogen phthalate*

| Example No. | 1 | 2 | A | B | C |
|---|---|---|---|---|---|
| PAA Moles | 2.6 | 2.6 | 2.6 | 2.0 | 2.6. |
| Alcohol | Isodecyl | Isodecyl | Isodecyl | Isodecyl | Isodecyl. |
| Moles Alcohol | 2.9 | 2.9 | 2.6 | 2.0 | 2.6. |
| Percent Excess Alcohol | 10 | 10 | 0.0 | 0.0 | 0.0. |
| Catalyst | 0.1 $H_3PO_4$ | 0.1 $H_3PO_4$ | 0.1 $H_3PO_4$ | 0.0 | BSA.[1] |
| Benzene (gms) | 110 | 110 | 0.0 | 0.0 | 121. |
| Temp., °C | 125 | 120 | 150 | 150 | 120. |
| Reaction Time, hrs | ½ | 1 | ½ | 1 | ½. |
| Percent Conversion to ½ Ester | 82 | 98 | 80 | 67 | 50. |
| Percent Diester | 0 | 0 | 0 | 0 | 21. |

[1] Benzene sulfonic acid.

The monoesters formed as described above were further esterified to the mixed isodecyl isooctyl phthalate by the addition of isooctyl alcohol, using 1.1 molar equivalents of alcohol based on the phthalic anhydride charged in Examples 1 and 2, and a 20% excess in the comparative examples A–C. The mixtures were then cooled to about 95° C. or slightly below, and benzene sulfonic acid was added as a catalyst. Temperatures were then raised to 130°–140° C., and refluxing continued under that temperature until esterification was complete.

The neutral esters thus produced were neutralized with NaOH, washed twice with dilute NaOH at 80° C., separated by stratification, and steam stripped at 135°–140° C. at 100 mm. Hg for 1½ hours. The esters were then carbon treated and dried at 100° C. and 100 mm. Hg for 30 minutes.

The resulting esters were then subjected to standard evaluation tests.

Conditions used in the second stage esterification and results of the evaluation tests are listed in Table II below. The example numbers correspond to the half esters produced in Table I.

cohol, produced esters of excellent color (20 Hazen), which had good color stability on heating for 2 hours at 200–205° C. The comparative phosphoric acid catalyzed run A carried out at 150° C., gave good conversion to half ester of 80% in ½ hour but, when esterification was completed with the second alcohol, produced esters of unacceptably high color of 150 Hazen.

Comparative run B carried out by the prior art process of using no catalyst in the first stage, and carrying out the reaction at 150° C. for 1 hour resulted in conversion to half ester of only 67%, and produced a mixed ester having high color, namely 100 Hazen. A similar run (Example C) using a benzene sulfonic acid catalyst produced only 50% of half ester in one half hour while producing 21% symmetrical diester. These runs, on completion of the esterification yielded esters of good initial color but poor color stability.

Distillation of the mixed diesters produced in Examples 1 and 2 in which 80% or higher half ester conversion was obtained, show a boiling range which starts above the 227°–229° C. (at 4 mm. Hg pressure) boiling range of 99% pure diisooctyl phthalate. This is indicative of only a small quantity of the diester of the lower molecular weight alcohol, whereas comparative run B carried out with no catalyst in the first stage, and achieving only 67% conversion, begins to distill within the boiling range

TABLE II

*Preparation of isodecyl isooctyl phthalate*

| Example No. | 1 | 2 | A | B | C |
|---|---|---|---|---|---|
| Second Stage Catalyst[1] | BSA | BSA | BSA | BSA | None Added. |
| Alcohol | Isooctyl | Isooctyl | Isooctyl | Isooctyl | Isooctyl. |
| Moles, Alcohol | 2.9 | 2.9 | 3.1 | 2.4 | 3.1. |
| Percent Excess Alcohol | 10 | 10 | 20 | 20 | 20. |
| Esterification Time, hrs. | 3½ | 3½ | 3½ | 3½ | 3½. |
| Temperature | 120–140 | 120–140 | 120–140 | 120–140 | 120–140. |
| Percent Diester | 98 | 98 | 98 | 98 | 98. |
| Yield Percent | 99 | 98 | 97.5 | 98 | 99. |
| Properties: | | | | | |
| Color Hazen | 20 | 20 | 150 | 100 | 25. |
| Acidity | .001 | .002 | .002 | .001 | .002. |
| Sap. No | 266.0 | 261.0 | 265.7 | | 266.3. |
| Heat Stability:[2] | | | | | |
| Color | 25 | 30 | 150+ | 150+ | 90. |
| Acidity | .014 | .015 | .016 | .043 | 0.19. |

[1] 2.7% based on phthalic anhydride.
[2] 2 hours at 200–205° C.

It will be noted from Tables I and II that the runs made according to the process of the invention using a phosphoric acid catalyzed reaction at temperatures of 120° and 125° C. (Examples 1 and 2) produced conversions to half ester of 82% in one half hour and 98% in one hour's reaction time, and upon further esterification to the mixed diester with the lower molecular weight alof the pure diisooctyl ester. This is indicative of the presence of considerable diisooctyl phthalate.

EXAMPLE 3

Isooctyl isodecyl phthalate was prepared in which isooctyl alcohol was used as the "first" alcohol in preparing the half ester. This run was carried out in the same manner as that described under Examples 1 and 2 except that isooctyl hydrogen phthalate was first prepared instead of isodecyl hydrogen phthalate. Comparative runs D–F were also carried out to illustrate the effect on half ester production of the use of no catalyst, of benzene sulfonic acid catalyst in the first stage, and the effect of using 20% excess of "first" alcohol rather than the preferred 10% excess.

Conditions and results of the tests are listed in Table III below.

TABLE III
*Preparation of monoisooctyl phthalate*

| Example No. | 3 | D | E | F |
|---|---|---|---|---|
| PAA, Moles | 2 | 2 | 2 | 2. |
| Alcohol | Isooctyl | Isooctyl | Isooctyl | Isooctyl. |
| Moles, Alcohol | 2 | 2 | 2.4 | 2. |
| Percent Excess Alcohol | 0 | 0 | 20 | 0. |
| Catalyst percent | 0.1 $H_3PO_4$ | 0 | 0 | Dilute BSA. |
| Benzene, gms | 0 | 0 | 0 | 0. |
| Temp., °C | 150 | 150 | 150 | 150. |
| Reaction Time, hrs | ½ | 1 | ½ | ½. |
| Percent Conversion to ½ Ester | 97 | 76.5 | 84.5 | <50. |

The monester produced in Example 3 using $H_3PO_4$ catalyst in the first stage and comparative Example D using no catalyst were further esterified to the mixed isooctyl isodecyl phthalate using 1.2 molar equivalents of alcohol in the same manner as described under Examples 1 and 2, and were recovered and evaluated in a similar manner. Conditions used in the second stage esterification and results of the evaluation tests are listed in Table IV.

TABLE IV
*Preparation of isooctyl isodecyl phthalate*

| Example No. | 3 | D |
|---|---|---|
| Half Ester Method | $H_3PO_4$ | No catalyst. |
| Second Stage Catalyst [1] | BSA | BSA. |
| "Second" Alcohol | Isodecyl | Isodecyl. |
| Moles, "Second" Alcohol | 2.4 | 2.4. |
| Percent Excess Alcohol | 20 | 20. |
| Esterification Time, Hrs | 3½ | 3½. |
| Percent Diester Conversion | 98 | 98. |
| Yield Percent | 97.5 | 97.5. |
| Properties: | | |
| Color Hazen | 50 | 70. |
| Acidity | .001 | .001. |
| Sap. No | 263 | 267. |
| Heat Stability: [2] | | |
| Color | 100 | 150+. |
| Acidity | .024 | .038. |

[1] 2.7% based on Phthalic Acid Anhydride.
[2] 2 hrs. at 200–205° C.

It will be noted from Table III that the phosphoric acid catalyzed reaction Example 3 gave a yield of 97% half ester whereas those without catalyst, Examples D and E, yielded only 76.5% and 84.5%, respectively. In addition, that reaction using benzene sulfonic acid catalyst, Example F, yielded less than 50% half ester. From Table IV it will be noted that both Example 3 using phosphoric acid and Example D using no catalyst, produced rather dark colored diesters, due to the relatively high temperature, (150° C.) used in each case, although the phosphoric acid catalyzed product was lighter (100 Hazen), than that produced with no catalyst (150+ Hazen). The most notable difference in the diester produced from the phosphoric acid catalyzed half ester and that from the uncatalyzed half ester is in its distillation range, that from the phosphoric acid catalyzed half ester having considerably less than 5% distilling at 235° C. which is a criterion of certain important plasticizer specifications. This product also showed generally less volatility in the lower portions of the distillation range, which is considered desirable.

EXAMPLE 4

*Preparation of butyl cyclohexyl phthalate*

One molar equivalent of solid flake phthalic anhydride was added to a 60° C. mixture, containing 1.1 molar equivalents of cyclohexyl alcohol, 12 parts benzene, and a quantity of 85% phosphoric acid equivalent to 0.2% by weight of the weight of the phthalic anhydride. The mix was then heated to reflux (approximately 120° C.), and maintained at this temperature for one hour. Percent conversion to cyclohexyl hydrogen phthalate was then determined by titration and found to be 87% of the half ester. To the mixture was then added 1.1 molar equivalents of butyl alcohol, and the mixture was cooled to 95° C. Benzene sulfonic acid catalyst was then added to the mixture. The temperature of the mixture was then raised and maintained at about 135° C. for 5½ hours until completion of the esterification.

The cooled, crude diester was neutralized with NaOH and washed twice with dilute NaOH at 80° C. The diester was then purified by steam stripping at 135–140° C. at 100 mm. Hg for 1½ hours, followed by treatment with active carbon and drying. The resulting neutral ester product had good color (20 Hazen) and good color stability.

A comparative esterification process (G) was carried out in exactly the same manner except that in the first stage a molar quantity of cyclohexyl alcohol was used and benzene sulfonic acid was added as a catalyst. A conversion to half ester of only about 50% was obtained. The completed diester therefore contained at least about 50% of combined dicyclohexyl phthalate and dibutyl phthalate and only about 50% of mixed ester. It had a good initial color, but poor color stability (>150) in the standard test.

Once again, the butyl cyclohexyl phthalate prepared according to my invention distilled within a considerably narrower range than the mixed ester prepared by the process employing a benzene sulfonic acid catalyst in the first stage of the esterification.

A summary of conditions and results obtained in the run of this example and the prior art run are shown in Table V below.

TABLE V

*Preparation of butyl cyclohexyl phthalate*

| Example | 4 | G |
|---|---|---|
| Half Ester Method | $H_3PO_4$ | BSA. |
| Half Ester Type | Cyclohexyl | Cyclohexyl. |
| Percent Conversion to Half Ester | 87 | ca. 50. |
| 2nd Alcohol | Butyl | Butyl. |
| Percent Excess | 10 | 10. |
| Esterification Time, Hours | 5½ | 5½. |
| Diester Conversion Percent by Titration | 98 | 98. |
| Yield, Percent | 92 | 92. |
| Properties: | | |
| Color, Hazen | 20 | 15. |
| Acidity | 0.003 | 0.002. |
| Saponification No | 367.8 | 369.8. |
| Heat Stability: 2 hrs. 200–205° C | 50 | >150. |
| Acidity | 0.108 | 0.147. |

EXAMPLE 5

*Preparation of butyl isodecyl phthalate*

One molar equivalent of solid, flake phthalic anhydride was added to a 60° C. mixture containing 1.1 molar equivalents of isodecyl alcohol, 13.0 parts of benzene and a quantity of 85% phosphoric acid equivalent to 0.1% by weight of the phthalic anhydride. The mix was then heated to reflux (about 120° C.) and maintained under reflux at that temperature for about 1 hour. Determination of half ester at this point showed 90% conversion to isodecyl hydrogen phthalate. To this mixture was then added 1.1 molar equivalent of butyl alcohol. The mixture was cooled to 95° C. and to it was added a quantity of benzene sulfonic acid catalyst. The mixture was then heated to about 145° C. for 4½ hours to complete the esterification. It was then cooled, and the crude ester purified as described in Example 4 above.

A comparative esterification (H) was carried out in exactly the same manner as that described above, except that in the first stage a molar quantity of isodecyl alcohol was used and benzene sulfonic acid catalyst. A conversion to half ester of only about 50% was obtained.

Distillation range determinations showed the ester produced by Example H to contain a substantially higher proportion of low boiling material than that of the butyl isodecyl phthalate prepared according to the present invention.

A summary of conditions and results is given in Table VI below.

TABLE VI

*Preparation of butyl isodecyl phthalate*

| Example | 5 | H |
|---|---|---|
| Half Ester Method | $H_3PO_4$ | BSA. |
| Half Ester Type | Isodecyl | Isodecyl. |
| Percent Conversion to Half Ester | 98 | ca. 50. |
| 2nd Alcohol | Butyl | Butyl. |
| Percent Excess | 10 | 20. |
| Esterification Time, Hours | 4½ | 4½. |
| Diester Conversion, percent by Titration | 98 | 98. |
| Yield, percent | 92 | 97. |
| Properties: | | |
| Color, Hazen | 30 | 25. |
| Acidity | 0.003 | 0.002. |
| Saponification No | 307.6 | 309.4 |
| Heat Stability: 2 hrs. 200–205° C | 35 | 20. |
| Acidity | 0.019 | 0.019. |

EXAMPLE 6

*Preparation of isodecyl hydrogen maleate*

Isodecyl hydrogen maleate was prepared by the method described in Example 4 above. The results and reaction conditions are summarized in Table VII.

TABLE VII

| Alcohol | Excess Alcohol, percent | Catalyst | Reaction Time, hrs. | Reaction Temp., ° C. | Yield, Percent |
|---|---|---|---|---|---|
| Isodecanol | 10.0 | 0.1% $H_3PO_4$ | 0.5 | 125–130 | 97.8 |
| Do | 10.0 | None | 0.5 | 125–130 | 93.0 |
| Do | 0.0 | 0.1% $H_3PO_4$ | 0.5 | 125–130 | 90.0 |
| Do | 0.0 | None | 0.5 | 125–130 | 84.5 |

EXAMPLE 7

*Preparation of isodecyl hydrogen succinate*

Isodecyl hydrogen succinate was prepared by the method described in Example 4 above. Only an equimolecular quantity of alcohol was employed. The results and reaction conditions are summarized in Table VIII.

TABLE VIII

| Alcohol | Catalyst | Reaction Time, hrs. | Reaction Temperature, ° C. | Yield, Percent |
|---|---|---|---|---|
| Isodecanol | 0.1% $H_3PO_4$ | 0.50 | 125–130 | 100 |
| Do | None | 0.50 | 125–130 | 96.0 |
| Do | 0.1% $H_3PO_4$ | 0.25 | 125–130 | 96.5 |
| Do | None | 0.25 | 125–130 | 92.0 |

The half-esters of maleic and succinic acids produced in Examples 6 and 7 are readily converted to mixed diesters by employing the procedure described in Example 4.

The mixed esters produced according to the process of my invention are useful as plasticizers in synthetic resin compositions such as polyvinyl chloride and copolymers of vinyl chloride with other monomers such as vinyl acetate, etc. for use in coating compositions and molded products such as floor coverings, wall coverings, etc., and as plasticizers in various synethtic rubbers such as butadiene-styrene copolymers, butadiene-acrylonitrile copolymers and the like. The uses of the mixed esters of the character prepared according to my invention are well established in the plasticizer field.

While the above describes the preferred embodiments of the invention, it will be understood that departures may be made therefrom within the scope of the specification and claims.

I claim:

1. The process for producing a mixed ester of a dicarboxylic acid which comprises heating a mixture of a cyclic anhydride of a dicarboxylic acid with a quantity of an alcohol of the formula $$ROH$$

wherein R is a radical selected from the group consisting of alkyl of 4 to 14 carbon atoms, and cycloalkyl of 6 to 8 carbon atoms, equivalent to between about 1.00 and about 1.12 molar equivalents of the cyclic anhydride charged, at a temperature between about 110° C. and about 130° C. in the presence of a small but catalytically effective quantity of phosphoric acid for a period sufficient to convert at least about 80% of the cyclic dicarboxylic acid anhydride charged, to the corresponding alkyl or cycloalkyl half ester, and thereafter reacting the half ester in the presence of a strongly acid catalyst selected from the group consisting of sulfuric acid and the sulfonic acids with at least 1.08 mol of a second alcohol per mol of half ester until esterification is substantially complete.

2. The process according to claim 1 wherein the cyclic anhydride is phthalic anhydride.

3. The process according to claim 2 wherein the alcohol ROH is isodecyl alcohol.

4. The process according to claim 3 wherein the second alcohol is butyl alcohol.

5. The process according to claim 3 wherein the second alcohol is isooctyl alcohol.

6. The process according to claim 2 wherein the alcohol ROH is cyclohexyl alcohol and the second alcohol is butyl alcohol.

References Cited in the file of this patent

UNITED STATES PATENTS

| 1,643,393 | Reid et al. | Sept. 27, 1927 |
| 2,237,729 | Evans et al. | Apr. 8, 1941 |
| 2,862,959 | Patrick et al. | Dec. 2, 1958 |

OTHER REFERENCES

Groggins: Unit Processes in Organic Synthesis, (New York, 1952), pages 621 to 623.